US007120652B2

(12) United States Patent
Maslowski

(10) Patent No.: US 7,120,652 B2
(45) Date of Patent: Oct. 10, 2006

(54) METHOD, SYSTEM AND PROGRAM FOR DETERMINING VERSION OF STORAGE DEVICES AND PROGRAMS INDICATED IN THE RESOURCE INFORMATION INSTALLED IN THE COMPUTER SYSTEM

(75) Inventor: Daniel J. Maslowski, Erie, CO (US)

(73) Assignee: Sun Microsystems, Inc., Palo Alto, CA (US)

( * ) Notice: Subject to any disclaimer, the term of this patent is extended or adjusted under 35 U.S.C. 154(b) by 735 days.

(21) Appl. No.: 10/134,181

(22) Filed: Apr. 25, 2002

(65) Prior Publication Data

US 2003/0204532 A1    Oct. 30, 2003

(51) Int. Cl.
G06F 17/30 (2006.01)
G06F 7/00 (2006.01)
G06F 9/44 (2006.01)
G06F 9/24 (2006.01)

(52) U.S. Cl. ................... 707/203; 707/3; 707/102; 717/170; 713/2

(58) Field of Classification Search ........ 719/321–328; 710/8–11; 713/1–2, 100, 191; 717/126–132, 717/168–177; 715/735, 737, 705, 853; 709/215–222, 709/224–225; 707/1–5, 200–201, 10, 100–102, 707/203; 726/35–36
See application file for complete search history.

(56) References Cited

U.S. PATENT DOCUMENTS

| 5,495,578 | A | * | 2/1996 | Rohrbaugh et al. ............ 714/51 |
| 5,666,534 | A | * | 9/1997 | Gilbert et al. .................. 713/1 |
| 5,701,472 | A | * | 12/1997 | Koerber et al. ............. 707/203 |
| 5,715,463 | A | * | 2/1998 | Merkin ........................ 717/175 |
| 5,745,767 | A | * | 4/1998 | Rosen et al. ................. 717/124 |
| 5,867,730 | A | * | 2/1999 | Leyda .......................... 710/10 |
| 6,059,842 | A | * | 5/2000 | Dumarot et al. ............ 717/153 |
| 6,131,192 | A | * | 10/2000 | Henry ......................... 717/175 |
| 6,138,252 | A | * | 10/2000 | Whitten et al. ............... 714/46 |
| 6,154,209 | A |  | 11/2000 | Naughton et al. |
| 6,192,471 | B1 | * | 2/2001 | Pearce et al. .................. 713/2 |
| 6,205,579 | B1 | * | 3/2001 | Southgate .................... 717/173 |
| 6,233,726 | B1 | * | 5/2001 | Bowman et al. ............ 717/107 |
| 6,268,850 | B1 |  | 7/2001 | Ng |
| 6,271,838 | B1 |  | 8/2001 | Gentner et al. |
| 6,301,592 | B1 | * | 10/2001 | Aoyama et al. ............ 715/511 |
| 6,360,255 | B1 | * | 3/2002 | McCormack et al. ....... 709/221 |

(Continued)

FOREIGN PATENT DOCUMENTS

EP         0317478 A2 *  5/1989      ................... 9/44

(Continued)

OTHER PUBLICATIONS

Auvo Hakkinen "standardizing linux", no date p. 17-27.*

(Continued)

Primary Examiner—Srirama Channavajjala
(74) Attorney, Agent, or Firm—Chapin IP Law, LLC; Barry W. Chapin, Esq.

(57) ABSTRACT

Provided are a method, system, and program for managing a configuration file including device parameters that define attributes of the device accessed by a device driver executing in a computer. The device driver uses the device parameters to control one or more devices in communication with the computer. A determination is made of device parameters provided with the device driver for a device, wherein the device parameters are maintained external to the configuration file. User selection of at least one of the determined device parameters is received and a parameter code for each selected device parameter is written to the configuration file.

22 Claims, 5 Drawing Sheets

U.S. PATENT DOCUMENTS

| | | | |
|---|---|---|---|
| 6,421,711 B1 * | 7/2002 | Blumenau et al. | 709/213 |
| 6,530,050 B1 * | 3/2003 | Mergard | 714/726 |
| 6,625,747 B1 * | 9/2003 | Tawil et al. | 714/6 |
| 6,745,224 B1 * | 6/2004 | D'Souza et al. | 709/202 |
| 6,880,086 B1 * | 4/2005 | Kidder et al. | 713/191 |
| 2002/0081779 A1 * | 6/2002 | Ammann et al. | 438/124 |
| 2002/0085047 A1 * | 7/2002 | Aritomi | 345/853 |
| 2002/0129129 A1 * | 9/2002 | Bloch et al. | 709/220 |
| 2002/0147771 A1 * | 10/2002 | Traversat et al. | 709/203 |
| 2002/0154153 A1 * | 10/2002 | Messinger et al. | 345/705 |
| 2002/0165961 A1 * | 11/2002 | Everdell et al. | 709/225 |
| 2003/0046678 A1 * | 3/2003 | Boxall et al. | 717/174 |
| 2003/0126195 A1 * | 7/2003 | Reynolds et al. | 709/203 |
| 2003/0132956 A1 * | 7/2003 | Duncan et al. | 345/735 |
| 2003/0145008 A1 * | 7/2003 | Burrell | 707/100 |
| 2003/0154266 A1 * | 8/2003 | Bobick et al. | 709/223 |
| 2003/0191833 A1 * | 10/2003 | Stein et al. | 709/224 |
| 2003/0195951 A1 * | 10/2003 | Wittel et al. | 709/220 |
| 2004/0006615 A1 * | 1/2004 | Jackson | 709/223 |
| 2004/0010494 A1 * | 1/2004 | Blaicher | 707/7 |
| 2004/0194053 A1 * | 9/2004 | Bonsma | 717/100 |

FOREIGN PATENT DOCUMENTS

| | | | | |
|---|---|---|---|---|
| EP | 0396834 | * | 11/1990 | 15/403 |
| EP | 0952703 | * | 10/1999 | 12/28 |
| EP | 1429569 | * | 6/2004 | 7/32 |
| EP | 1337073 A1 * | | 8/2005 | 12/24 |
| GB | 2382424 | * | 8/2002 | 9/312 |
| WO | WO 03/003198 A1 * | | 1/2003 | 9/44 |
| WO | WO 2004027607 | * | 4/2004 | 9/44 |
| WO | WO 2005114397 | * | 12/2005 | 9/44 |

OTHER PUBLICATIONS

Vincent Perrier, "making java work in embedded devices", Sep. 2001, Java developers journal.com, pp. 92,94,96.*

Vincent Lenders et al. "hybrid Jini for limited devices", Jun. 2001, ETH TIK-Nr. 119, pp. 1-9.*

Robert Schifreen, "introducing whistler", PC network advisor, Issue 127: Feb. 2001, 7 pages.*

IBM—IMS data propagator for z/OS, An introduction version 3, release 1, Oct. 2001 pp. 1-50.*

SPEC CPU 2000 utility programs, www.spec.org/cpu2000/docs/, Oct. 29, 2001, 12 pages.*

"Storage subsystem Manager 2.0 software user's guide", Sun StorEdge D240 Media Tray, Sun StorEdge S1 Array, Jun. 2003, Rev A, 27 pages.*

Hong Mei et al. "a software configuration management model for supporting component-based software developement", ACM SIGSOFT, Software Engineering Notes vol. 26, No. 2 Mar. 2001 pp. 53-58.*

Microsoft Corporation. "About Windows Update", [online], [Retrieved on Apr. 8, 2002]. Retrieved from the Internet at <URL: http://windowsupdate.microsoft.com/R957/V31site/x86/nt5/en/le5/about.htm>.

Princeton University. "man page— prtconf", [online], [Retrieved on Apr. 8, 2002]. Retrieved from the Internet at <URL: http://campuscgi.princeton.edu/man?prtconf>.

Sun Microsystems, Inc. "Sun StorEdge™ T3 Array", Jul. 2000. pp. 1-41.

* cited by examiner

METHOD, SYSTEM AND PROGRAM FOR DETERMINING VERSION OF STORAGE DEVICES AND PROGRAMS INDICATED IN THE RESOURCE INFORMATION INSTALLED IN THE COMPUTER SYSTEM

BACKGROUND OF THE INVENTION

1. Field of the Invention

The present invention relates to a method, system, and program for determining system information from a computer system.

2. Description of the Related Art

In certain instances, a software distributor or technical support agent may want to determine the configuration of a customer computer system. In the prior art, tailor made utilities are provided to determine system configuration information for particular uses. For instance, in the Unix** operating system, the "prtconf" command is used to print system configuration information, whose output includes the total amount of memory and the configuration of system peripherals formatted as a device tree.

Further, software vendors will sometimes query a customer's computer over a network to determine the system configuration for purposes of whether any upgrades or fixes for that system are available. For instance, Microsoft Corporation provides a Windows® update utility that is downloaded to the user's computer to scan the computer to determine whether any new version of installed components are available. The utility displays a list of recent versions of the determined components on the user's computer that the user can select to install.

Such prior art utility programs for determining system configuration information are designed for specific uses and not intended for general purpose queries of system information. For this reason, there is a need in the art for improved techniques for providing utilities to determine system information and to allow software vendors and others to configure such utilities for different purposes.

SUMMARY OF THE PREFERRED EMBODIMENTS

Provided are a method, system, and program for determining system information from a computer system having at least one attached device. Resource information indicating at least one program and at least one device is processed. The computer system is queried to determine whether the at least one device indicated in the resource information is coupled to the computer system and the computer system is searched to determine whether at least one program indicated in the resource information is installed in the computer system. System information is generated that indicates determined devices and programs in the computer system. The system information is then rendered, such that the rendered system information on the determined devices and programs is capable of being presented in a human observable format.

In further implementations, the resource information is edited to modify the at least one program or at least one device indicated in the resource information.

In yet further implementations, the resource information further indicates files. The computer system is searched to determine whether the computer system includes at least one file indicated in the resource information. Information is included in the system information indicating any determined files in the computer system.

Still further, the resource information may be coded in a program that performs the steps of processing the resource information, querying and searching the computer system, and generating the system information. In such implementations, the resource information is capable of being configured to modify at least one of the devices and programs indicated in the resource information.

Further provided are a method, system, and program for determining system information. Resource information in a utility program is edited to indicate at least one program and at least one device. The utility program is deployed to determine system information for a computer system The utility program is invoked to perform the operations of querying the computer system to determine whether the at least one device indicated in the resource information is coupled to the computer system; searching the computer system to determine whether at least one program indicated in the resource information is installed in the computer system; and generating system information indicating determined devices and programs in the computer system, wherein the system information is capable of being rendered a human observable format to present information on the determine devices and programs.

In further implementations, the system information to a remote computer over a network. In such further implementations, the remote computer may be operated by a technical support agent providing technical support to a user of the computer system. The technical support agent would use the system information when providing technical support on the computer system to the user.

The described implementations provide techniques to search for devices and programs installed on a host system using a program that may be configured to alter the resources that are subject to searching on the host system.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
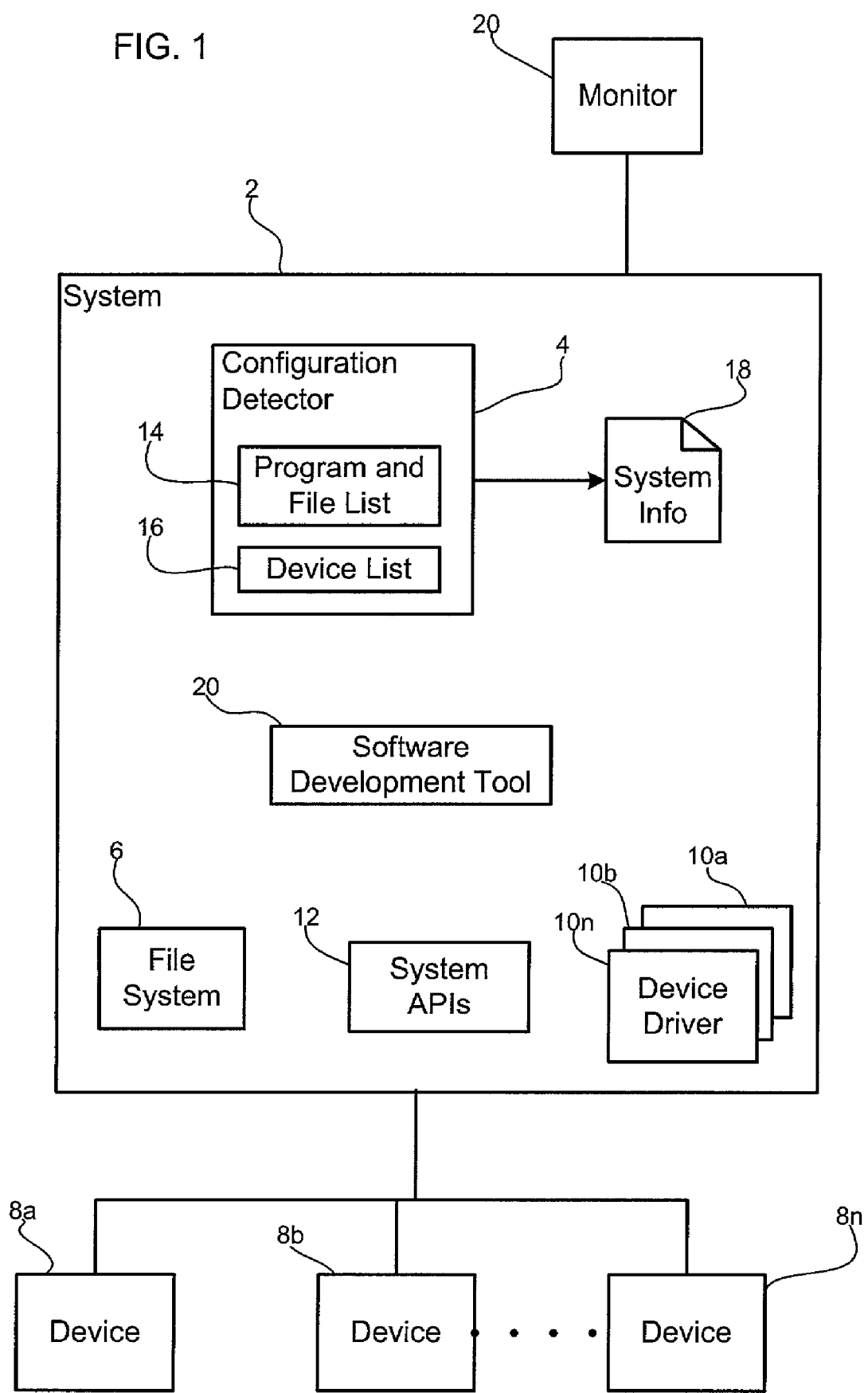
FIG. 1 illustrates a computing environment in which aspects of the invention are implemented.

FIG. 1 illustrates a computing environment in which aspects of the invention are implemented. A computer system 2 includes a configuration detector utility 4 that is invoked to detect the presence of specified devices and computer programs. The configuration detector utility 4 may be implemented as a standalone program or utility executing on the computer system 2. The computer 2 includes a file system 6 that organizes and provides access to files and programs in storage devices coupled to the computer 2. A plurality of devices 8a, 8b... 8n are coupled to the computer system 2. One or more of the devices 8a, 8b... 8n may be coupled to the computer 2 over a network or communication interface, such as a serial, parallel, or other connection. Certain of the devices 8a, 8b... 8n may comprise a peripheral card inserted into an expansion slot of the computer system 2 or comprise a device embedded on the main circuit board of the system 2. The computer system 2 further includes device drivers 10a, 10b... 10n that are used by the computer system 2 to access the attached devices 8a, 8b... 8n, respectively.

The computer 2 further includes system Application Programming Interfaces (APIs) 12, which may be provided with an operating system of the computer 2, that are used to make calls to access information on attached devices. For instance, in a Microsoft Windows® environment, the system APIs may comprise functions calls to programs that are capable of accessing information on attached devices and installed programs, such as the Windows device manager program. Additionally, the system APIs 12 may comprise functions used to discover device information, such as Small Computer System Interface (SCSI) discovery commands, IOCTLs, etc. Still further, the APIs 12 that are used may involve searches of a system registry or other similar type file for information.

The configuration detection utility 4 includes a program and file list 14 indicating files and programs and a device list 16 indicating devices 8a, 8b... 8n that the configuration detection utility 4 will search for on the computer system 2. The devices in the device list 16 may include the operating system, central processing unit (CPU), memory, attached storage devices (e.g., tape drives, hard disk drives, disk arrays, optical disk drives, etc.) In certain implementations, the program and file list 14 and device list 16 may be edited by a user to modify the resources that are searched. For instance, a software development tool 20, such as Microsoft® Visual Studio®, may be used to edit the program and file list 14 and/or device list resources 16 in the executable configuration detector 4 program to add, remove or modify the devices, files, and/or programs the configuration detector 4 will seek to detect on the system 2. Alternatively, in certain implementations, only the program and file list 14 may be resources that a user may edit using a software development tool.

Figure 2:
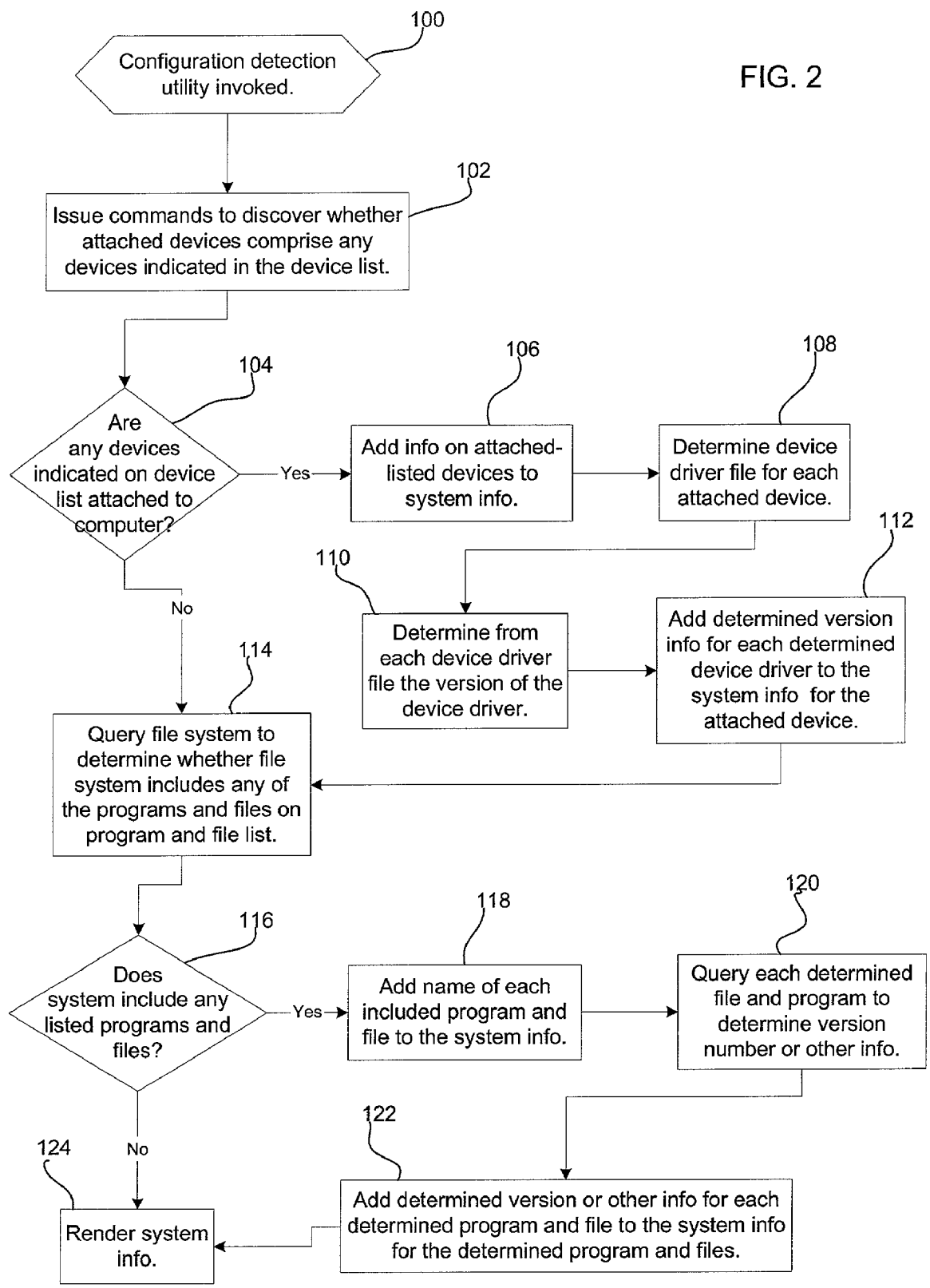
FIG. 2 illustrates logic to detect a system configuration in accordance with implementations of the invention.

FIG. 2 illustrates logic implemented in the configuration detector 4 to determine and render information on a system configuration. The configuration detector 4 may be invoked (at block 100) by a user starting the executable configuration detector 4. Additionally, the configuration detector may be downloaded from a host system over a network to run on a user computer 2 to determine system information 18. For instance, in cases where a computer hardware or software vendor is providing technical support to a customer, the software vendor may automatically or at the customer request, download the configuration detector 4 to run on the customer system 2 to determine the system configuration. In such cases, the system configuration detector 4 may then transmit the system information 18 back to the software vendor system providing the support for consideration by the technical support representative. After invocation, the configuration detector 4 would issue (at block 102) commands to determine whether the system 2 devices 8a, 8b... 8n match components listed on the device list 16. The commands that are issued at block 102 may comprise discovery commands that are part of a device interface protocol, such as SCSI, IOCTL, etc. Additionally, the issued device discovery commands may include calls to system APIs 12 that in turn call an operating system or other program that is capable of accessing information on installed devices.

If (at block 104) the devices 8a, 8b... 8n coupled to the system 2 are indicated on the device list 16, i.e., attached-listed devices, then information on the attached-listed devices are added (at block 106) to the system information 18 being rendered. The configuration detector 4 then determines (at block 108) the device driver files 10a, 10b... 10n for each of the attached-listed devices. The determined device driver files 10a, 10b... 10n may be indicated in the device list 16 with the devices, in the program and file list 14 or may be determined when querying the device 10a, 10b... 10n or a system registry file. The version of the determined device driver files 10a, 10b... 10n is determined (at block 110) and the information on the determined version for the added devices is added (at block 112) to the system information 18.

Control then proceeds to block 114, from the no branch of block 104 or 112, to query the file system 6 to determine whether the file system 6 includes any of the programs and/or files indicated in the program and files list 14. If (at block 116) the file system 6 includes one or more files or programs matching those indicated on the program and files list 14, then the configuration detector 4 adds (at block 118) the name of each determined program and/or file to the system information 18. The configuration detector 4 would further query (at block 120) each determined program and/or file to determine the version information and add (at block 122) such determined version information for the determined program and/or files to the system information 18. In alternative implementations, listed files and programs may be determined by scanning a system registry or repository of system information. The system information 18 may then be rendered (at block 124) by displaying the determined system information 18 on the attached monitor 20 or other output device capable of rendering information in a human observable format. Alternatively, the system information 18 may be rendered in a file that may be stored on a storage device or transmitted to a remote location over a network, wherein the system information 18 may later be generated as output from the stored or transmitted file.

Figure 3:
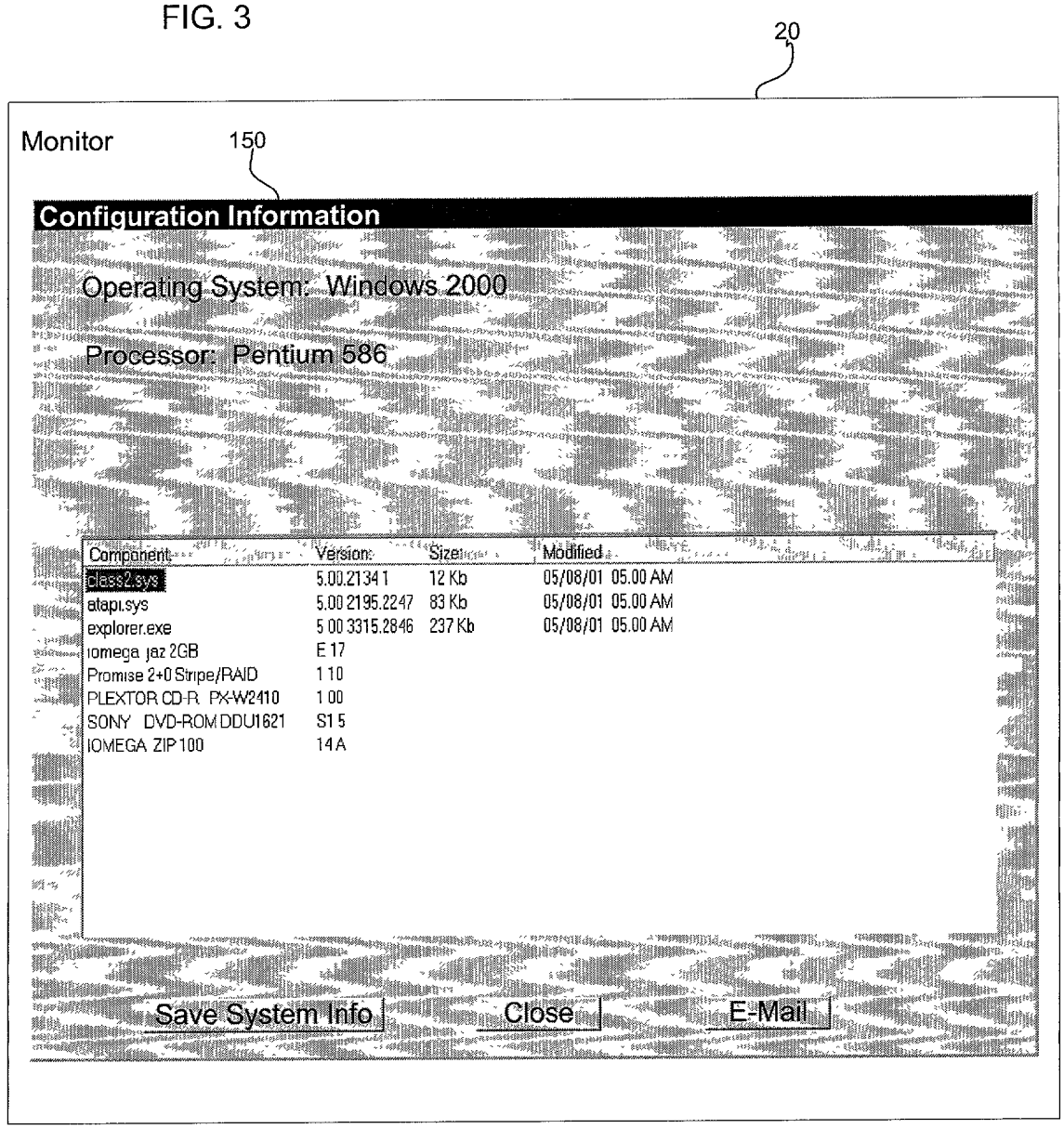
FIG. 3 illustrates an example of a Graphical User Interface (GUI) panel displaying system configuration information in accordance with implementations of the invention.

FIG. 3 illustrates an example of a graphical user interface (GUI) presentation 150 of the system information 18 on the monitor 20. The GUI 150 displays information on certain installed programs, such as the operating system, explorer.exe, class2.sys, and atapi.sys, including version information, size and date last modified information as well as the presence of certain installed devices, such as a CD reader, CD writer, RAID controller, disk drives, etc., as well as the version number of such devices. The GUI 150 further displays controls to save the displayed system information 18 in a file, close the GUI 20 or e-mail or otherwise transmit the system information 18 to an external device.

In described implementations, the configuration detector 4 gathers various types of system information, including information on attached hardware devices and installed programs and available files and may render such information in various formats.

Further, with the described implementations, a software or hardware vendor may use a software development tool to customize the files and/or devices, indicated in the lists 14 and/or 16, that are searched during the operation of the configuration detector 4. In this way, the vendor may tailor the search of components to those that are of interest to the vendor and that may assist while providing technical support or other services. As mentioned, a vendor could deploy the configuration detector 4 on a user system to determine installed components and then have the configuration detector 4 transmit the system information 18 to the vendor agent over a network, such as the Internet, to review when providing support. In this way, the configuration detector comprises a utility that may be readily configured for deployment to obtain information on specific types of devices and transmit such information to remote systems over networks.

Figure 4:
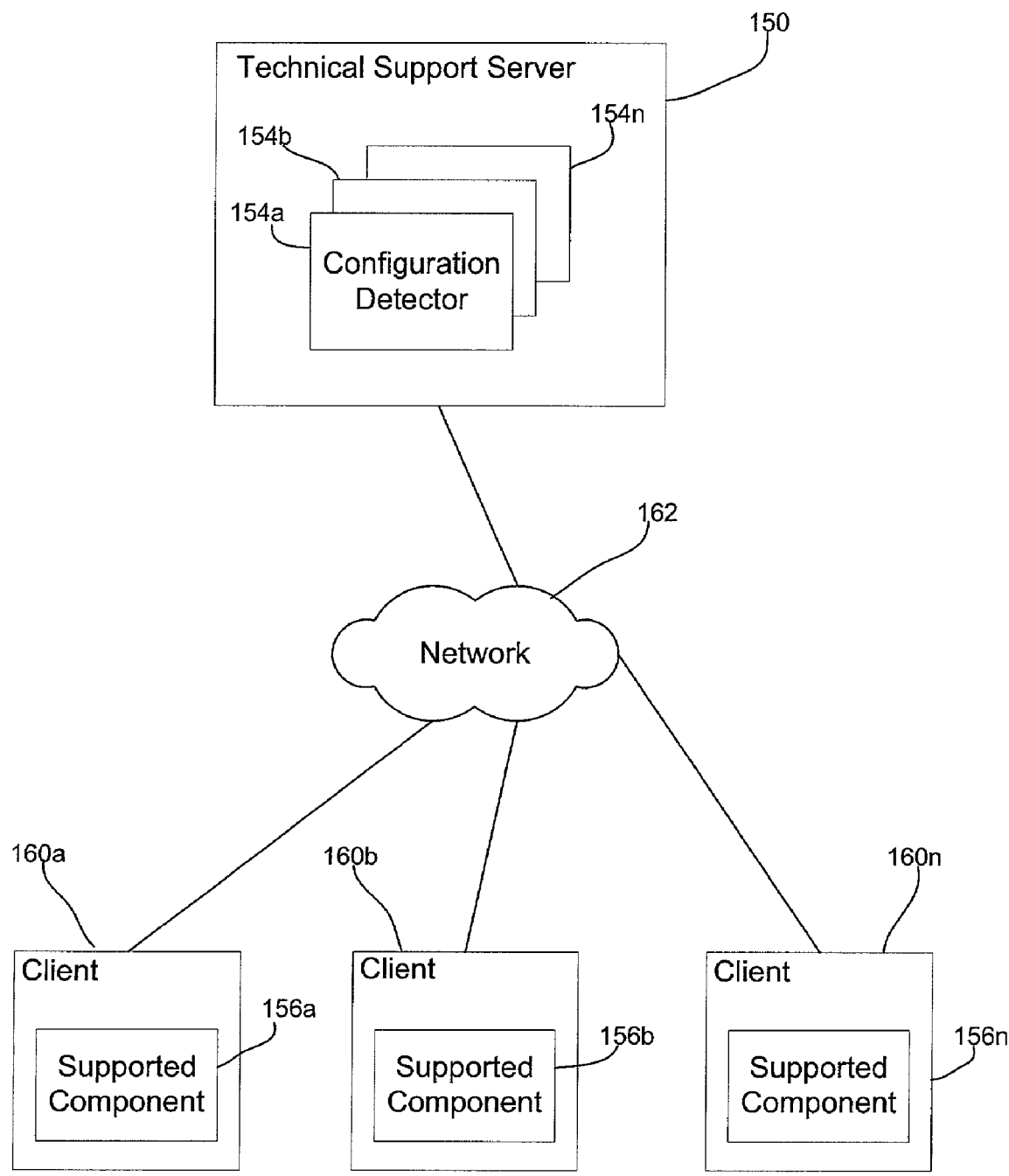
FIG. 4 illustrates a network computing environment in which aspects of the invention may be implemented.

FIG. 4 illustrates an implementation where a technical support server 150 maintains configuration detectors 154a, 154b. . . 154n for different components 156a, 156b. . . 156n that are supported by the operator of the technical support server 150, where the supported component may comprise any type of hardware device, software program or computer system. Each configuration detector 154, 154b. . . 154n indicates different components, e.g., programs, files, and devices in the lists 14 and 16 (FIG. 1) relevant to the supported component 156a, 156b. . . 156n. These different configuration detectors 154a, 154b. . . 154n for the different components 156a, 156b, 156n may search for different sets of programs, files, and devices the technical support agent needs to know of when providing technical support for the supported component 156a, 156b. . . 156n. For instance, different supported components 156a, 156b. . . 156n may be affected by specific installed or attached devices and their drivers. For this reason, lists 14 and 16 may be different in the configuration detectors 154a, 154b. . . 154n deployed for the different supported components 156a, 156b. . . 156n for which technical support is being provided, i.e., information on certain installed components may be relevant for certain supported components, but not others. In this way, the technical support agent can determine whether any of the installed components or their drivers are causing a conflict or other problems with the component for which technical support is being provided.

In the implementation of FIG. 4, the technical support server 150 communicates with client systems 160a, 160b. . . 160n that may each include any one or more of the supported components 156a, 156b. . . 156n over a network 162. The network may comprise the Internet, an Intranet, a Local Area Network (LAN), Wide Area Network (WAN), etc. The technical support server 150 may comprise one or more computer systems. In the implementation of FIG. 4, the technical support server 150 would deploy the configuration detector 154a, 154b. . . 154n for the client 160a, 160b. . . 160n depending on the supported component 156a, 156b. . . 156n installed or attached to the client 160a, 160b. . . 160n for which technical support is to be provided. The deployment may involve transmitting the configuration detector 154a, 154b. . . 154n to the client 160a, 160b. . . 160n to execute on the client system. Alternatively, the deployed configuration detector 154a, 154b. . . 154n may run on the technical support server 150, and query and search the client 160a, 160b. . . 160n over the network 158. The deployed configuration detector 154a, 154b. . . 154n would then generate system information on the client 160a, 160b. . . 160n, including information on any installed or attached hardware devices or programs indicated in the lists 14 and 16, and transmit the system information back to the technical support server 150 over the network 158.

Additional Implementation Details

The described configuration utility may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the GUI window displayed with system information, as shown in FIG. 3, comprised a graphical user interface (GUI) that the user manipulates using any input device known in the art, such as a keyboard, mouse pointer, pen stylus, touch screen having comprising a display device with a touch-sensitive transparent panel, microphone for receiving voice activated commands, etc. Additionally, the user interface may comprise an audio output and input device, where the audio output device generates audio output that inform the user of the configuration options and the audio input device receives audio signals from the user to select user interface options and settings for the configuration file.

In the described implementations, the programs, files and devices to search for in the computer system 2 are coded in the executable configuration detector 14 and capable of being edited and modified using a software development tool. In alternative implementations, the files, programs, and devices to search for in the system may be maintained in a separate file that is processed by the configuration detector 4 and capable of being edited by a text editor. Alternatively, the files, programs and devices to search may be maintained in a same resource or file, or distributed across the more than two lists or separate components.

In the described implementations, the resource information on devices, files, and programs to detect was implemented in separate lists 14 and 16. In further implementations, the information on the components to detect may be maintained in a single resource data structure or distributed across more than two data structures. The data structure(s) in which the resource information is implemented an object within a program, a section of code within the program, a separate file, etc.

The configuration detector utility was described as being used for technical support purposes. However, the generated system information may be used for any purpose, such as determining upgrades and fixes that may be applied to the computer system, determining what is installed, etc.

The illustrated logic of FIG. 2 indicates certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

In the described implementations, the configuration detector determined system information on the computer system in which the detector program executes. In alternative implementations, the configuration detector may execute on one computer in a network to detect program files, devices, and files in another remote computer on the network by issuing queries of the remote computer over the network to determine whether the remote computer includes any devices, programs or files matching those on the program and file list 14 and device list 16.

In certain implementations, the configuration detector 4 is deployed by downloading the configuration detector 4 from a remote site to execute on the computer system 2 in which the configuration is to be detected. In alternative implementations, the configuration detector 4 may be deployed through alternative channels, such as on a removable storage medium that is distributed to the user of the computer system.

In certain implementations, the program and file list 14 may indicate default directories in the file system to search for listed files and/or programs. Additionally, the user may be given the opportunity to locate the directory to search for the listed file or program if the file or program is not located in the default location.

Figure 5:
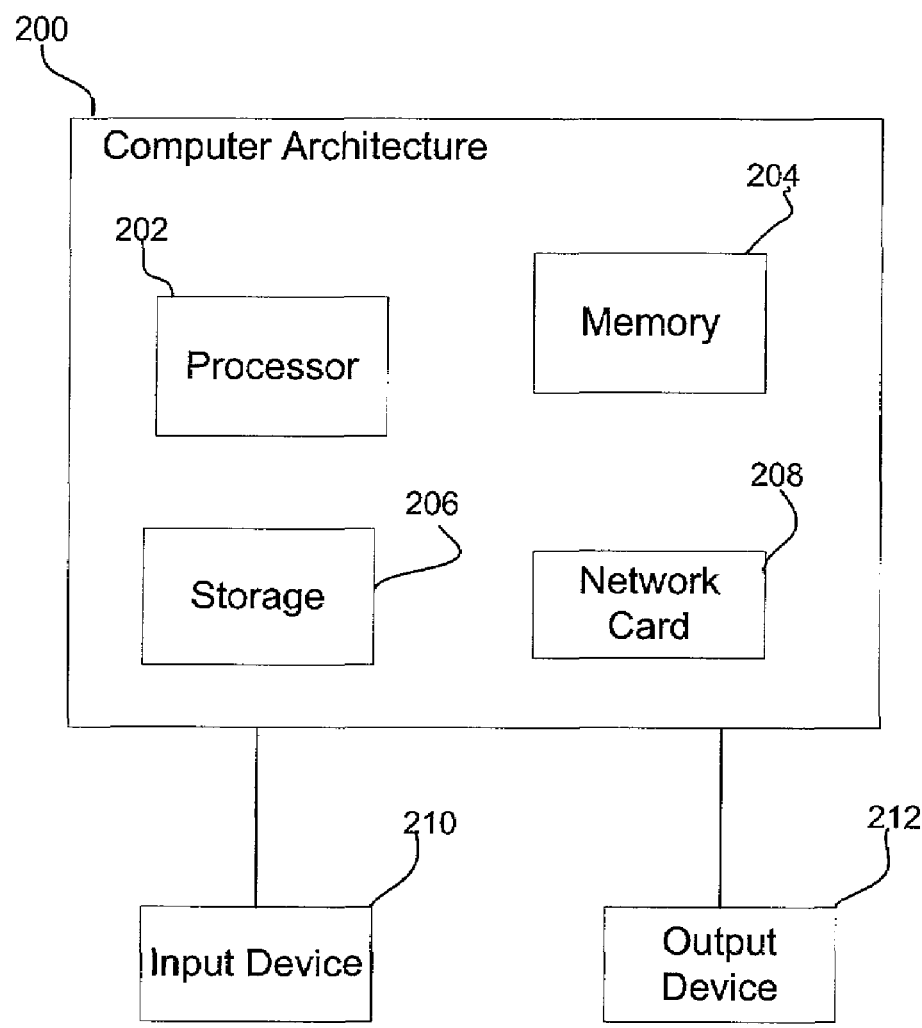
FIG. 5 illustrates a computer architecture which may be utilized with certain implementations of the invention.

FIG. 5 illustrates one implementation of the architecture of the system 2. The system 2 may implement a computer architecture 200 having a processor 202 (e.g., a microprocessor), a memory 204 (e.g., a volatile memory device), and storage 206 (e.g., a non-volatile storage, such as magnetic disk drives, optical disk drives, a tape drive, etc.). The storage 206 may comprise an internal storage device or an attached or network accessible storage. Programs in the storage 206 are loaded into the memory 204 and executed by the processor 202 in a manner known in the art. The architecture further includes a network card 208 to enable communication with a network. An input device 210 is used to provide user input to the processor 202, and may include a keyboard, mouse, pen-stylus, microphone, touch sensitive display screen, or any other activation or input mechanism known in the art. An output device 212 is capable of rendering information transmitted from the processor 202, or other component, such as a display monitor, printer, storage, etc.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for determining system information from a computer system having at least one attached storage device, comprising:

processing resource information indicating at least one program and at least one storage device, wherein the resource information further indicates files and wherein the resource information indicates directories in a file system in the computer system in which to search for the at least one program and file, wherein the resource information is one of the group consisting of coded in a program that performs the steps of processing the resource information, querying and searching the computer system, and generating the system information, and wherein the resource information is capable of being configured to modify at least one of the storage devices and programs indicated in the resource information; and maintained in a file separate from a program that performs the steps of processing the resource information, querying and searching the computer system, and generating the system information, and wherein the resource information is capable of being configured to modify at least one of the storage devices and programs indicated in the resource information;

querying the computer system to determine whether the at least one storage device indicated in the resource information is coupled to the computer system;

when the response to said querying indicates the at least one storage device is coupled to said system then searching the computer system to determine whether at least one program indicated in the resource information is installed in the computer system and to determine whether the computer system includes the at least one file indicated in the resource information;

searching for the at least one program and the at least one file indicated in the system information at locations in the file system not indicated in the resource information;

generating system information indicating the at least one storage device the at least one program in the computer system and the at least one file in the computer system;

determining a version of the at least one storage device and the at least one program;

including the version information for the at least one storage device and the at least one program in the system information; and rendering the system information, said system information indicating version information relating to the at least one storage device, the at least one program and the at least one file wherein the rendered system information is capable of being presented in a human observable format, including at least one of displayed on a monitor, rendered in a file stored on a storage device and transmitted to a remote location over a network.

2. The method of claim 1, further comprising:

editing the resource information to modify the at least one program or the at least one storage device indicated in the resource information.

3. The method of claim 1, further comprising:

displaying the system information, including information on the at least one storage device, the at least one program, and the at least one file and version information therefor.

4. The method of claim 1, wherein a program performs the steps of processing the resource information, querying and searching the computer system, and generating the system information, further comprising:
transmitting the program from a server to the computer system over a network;
invoking the program to perform the steps of processing the resource information,
querying and searching the computer system, and generating the system information; and transmitting the system information from the computer system to the server.

5. The method of claim 1, wherein the resource information indicating the at least one storage device and at least one program is included in at least one list.

6. The method of claim 1 wherein said searching for programs and files further comprises providing a user an opportunity to locate the directory of said programs and files when said programs and files are not in a default location.

7. A method for determining system information from a computer system having at least one attached storage device, the method comprising:
editing resource information in a utility program indicating at least one program and at least one storage device, and wherein the resource information indicates storage devices and programs that are known to cause operational difficulties for the supported component;
deploying the utility program to determine system information for a computer system;
invoking the utility program to perform the operations of:
querying the computer system to determine whether the at least one storage device indicated in the resource information is coupled to the computer system;
when the response to said querying indicates the at least one storage device is coupled to said system then searching the computer system to determine whether the at least one program indicated in the resource information is installed in the computer system;
searching for the at least one programs and files indicated in the system information at locations in the file system not indicated in the resource information;
generating system information indicating the at least one storage device and the at least one program in the computer system, wherein the system information is capable of being rendered in a human observable format to present information on the at least one storage device and at least one program;
providing multiple utility programs for different supported components, wherein the resource information in at least two of the utility programs indicates different programs and storage devices; and
determining the supported component installed on the user computer system for which the user wants technical support, wherein deploying the utility program comprises deploying the utility program provided for the supported component installed on the user computer.

8. The method of claim 7, wherein deploying the utility program comprises transmitting the utility program to the computer system over a network.

9. The method of claim 7, wherein invoking the utility program comprises executing the utility program on a remote computer system that communicates with the computer system over a network.

10. The method of claim 9, wherein invoking the utility program comprises executing the utility program on the computer system.

11. The method of claim 7, further comprising:
transmitting the system information to a remote computer over a network.

12. The method of claim 11, wherein the remote computer is operated by a technical support agent providing technical support to a user of the computer system, and
wherein the technical support agent uses the system information when providing technical support on the computer system to the user.

13. The method of claim 12, wherein the technical support agent is providing support for a supported component on the user computer system.

14. The method of claim 7 wherein said searching for programs and files further comprises providing a user an opportunity to locate the directory of said programs and files when said programs and files are not in a default location.

15. A system for determining system information from a computer system having at least one attached storage device, comprising:
means for editing resource information in a utility program indicating at least one program and at least one storage device;
means for deploying the utility program to determine system information for a computer system;
means for providing multiple utility programs for different supported components, wherein the resource information in at least two of the utility programs indicates different programs and storage devices;
means for determining the supported component installed on the user computer system for which the user wants technical support, wherein deploying the utility program comprises deploying the utility program provided for the supported component installed on the user computer; and
means for invoking the utility program to perform the operations of:
querying the computer system to determine whether the at least one storage device indicated in the resource information is coupled to the computer system;
when the response to said querying indicates the at least one storage device is coupled to said system then searching the computer system to determine whether at least one program indicated in the resource information is installed in the computer system;
searching for the at least one program and the at least one file indicated in the system information at locations in the file system not indicated in the resource information; and
generating system information indicating the at least one storage device and the at least one program in the computer system, wherein the system information is capable of being rendered in a human observable format to present information on the
at least one storage device and the at least one program including at least one of being displayed on a monitor, being rendered in a file stored on a storage device and being transmitted to a remote location over a network.

16. The system of claim 15, further comprising:
means for transmitting the system information to a remote computer over a network, wherein the remote computer is operated by a technical support agent providing technical support to a user of the computer system, and wherein the technical support agent uses the system information when providing technical support on the computer system to the user.

17. The system of claim 15 wherein said searching for programs and files further comprises providing a user an opportunity to locate the directory of said programs and files when said programs and files are not in a default location.

18. An article of manufacture for determining system information from a computer system having at least one attached storage device, wherein the article of manufacture comprises a computer readable storage medium having computer readable code thereon, the storage medium comprising:

instructions for processing resource information indicating at least one program and at least one storage device, wherein the resource information further indicates files and directories in a file system in the computer system in which to search for the at least one program and file, wherein the resource information is one of the group consisting of coded in a program that performs the steps of processing the resource information, querying and searching the computer system, and generating the system information, and wherein the resource information is capable of being configured to modify at least one of the storage devices and programs indicated in the resource information; and maintained in a file separate from a program that performs the steps of processing the resource information, querying and searching the computer system, and generating the system information, and wherein the resource information is capable of being configured to modify at least one of the storage devices and programs indicated in the resource information;

instructions for querying the computer system to determine whether the at least one storage device indicated in the resource information is coupled to the computer system;

instructions for when the response to said querying indicates the at least one storage device is coupled to said system then searching the computer system to determine whether at least one program indicated in the resource information is installed in the computer system and to determine whether the computer system includes at least one file indicated in the resource information;

instructions for searching for the at least one program and the at least one file indicated in the system information at locations in the file system not indicated in the resource information;

instructions for generating system information indicating the at least one storage device, the at least one program and the at least one file in the computer system;

instructions for determining a version of the at least one storage device and at least one program; and instructions for including the version information for the at least one storage device and at least one program in the system information; and instructions for rendering the system information, wherein the rendered system information is capable of being presented in a human observable format, including at least one of displayed on a monitor, rendered in a file stored on a storage device, and transmitted to a remote location over a network.

19. The article of manufacture of claim 18, further comprising:

instructions for editing the resource information to modify the at least one program or at least one storage device indicated in the resource information.

20. The article of manufacture of claim 18, further comprising:

instructions for displaying the system information, including information on the at least one storage device, at least one program, and at least one file and version information therefor.

21. The article of manufacture of claim 18, further comprising:

instructions for transmitting the system information from the computer system to the server.

22. A method for determining system information from a computer system having at least one attached storage device, comprising:

editing resource information in a utility program indicating at least one program and at least one storage device, and wherein the resource information indicates storage devices and programs that are known to cause operational difficulties for the supported component and wherein the resource information further indicates files and wherein the resource information indicates directories in a file system in the computer system in which to search for the at least one program and file;

deploying the utility program to determine system information for a computer system;

invoking the utility program to perform the operations of:

querying the computer system to determine whether the at least one storage device indicated in the resource information is coupled to the computer system;

searching the computer system to determine whether at least one program indicated in the resource information is installed in the computer system and to determine whether the computer system includes at least one file indicated in the resource information;

searching for programs and files indicated in the system information at locations in the file system not indicated in the resource information;

generating system information indicating at least one storage device and at least one program in the computer system and including information in the system information indicating any determined files in the computer system, wherein the system information is capable of being rendered in a human observable format to present information on the at least one storage device and at least one program;

providing multiple utility programs for different supported components, wherein the resource information in at least two of the utility programs indicates different programs and storage devices; and determining the supported component installed on the user computer system for which the user wants technical support, wherein deploying the utility program comprises deploying the utility program provided for the supported component installed on the user computer.

\* \* \* \* \*